United States Patent
Elflein et al.

(10) Patent No.: US 12,030,494 B2
(45) Date of Patent: Jul. 9, 2024

(54) ADAPTIVE DISTANCE SELECTION FOR OPTIMIZING EFFICIENCY

(71) Applicant: Bayerische Motoren Werke Aktiengesellschaft, Munich (DE)

(72) Inventors: Johannes Elflein, Munich (DE); Mark van Gelikum, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 8 days.

(21) Appl. No.: 16/818,706

(22) Filed: Mar. 13, 2020

(65) Prior Publication Data

US 2020/0216069 A1 Jul. 9, 2020

Related U.S. Application Data

(63) Continuation of application No. PCT/EP2018/074624, filed on Sep. 12, 2018.

(30) Foreign Application Priority Data

Sep. 15, 2017 (DE) ..................... 10 2017 216 408.5

(51) Int. Cl.
*B60W 30/16* (2020.01)
*B60W 50/00* (2006.01)

(52) U.S. Cl.
CPC ........ *B60W 30/16* (2013.01); *B60W 50/0097* (2013.01); *B60W 2552/05* (2020.02); *B60W 2554/406* (2020.02); *B60W 2556/50* (2020.02)

(58) Field of Classification Search
CPC .................................................. B60W 30/16
See application file for complete search history.

(56) References Cited

U.S. PATENT DOCUMENTS

| 9,266,536 B2 | 2/2016 | Loria et al. |
| 2008/0162011 A1 | 7/2008 | Pfeiffer et al. |
| 2012/0022764 A1* | 1/2012 | Tang ................. B60W 50/0097 701/102 |

(Continued)

FOREIGN PATENT DOCUMENTS

| CN | 101263026 A | 9/2008 |
| CN | 103347757 A | 10/2013 |

(Continued)

OTHER PUBLICATIONS

International Search Report (PCT/ISA/210) issued in PCT Application No. PCT/EP2018/074624 dated Nov. 22, 2018 with English translation (five (5) pages).

(Continued)

*Primary Examiner* — Imran K Mustafa
(74) *Attorney, Agent, or Firm* — Crowell & Moring LLP

(57) ABSTRACT

The disclosed subject matter describes a method for setting an automatic distance from and behavior with respect to a vehicle in front. The automatic distance can be optimized based on the situation and energy efficiency. A current traffic situation is detected. A traffic situation on a road section yet to be traveled can be predicted. Energy consumption depending on a variation in the distance from the vehicle in front can be measured. A distance from the vehicle in front can be set depending on the currently detected traffic situation, the predicted traffic situation, and the measured energy consumption.

21 Claims, 2 Drawing Sheets

(56) References Cited

U.S. PATENT DOCUMENTS

| | | | | |
|---|---|---|---|---|
| 2012/0119894 A1* | 5/2012 | Pandy | .................. | B60W 30/16 |
| | | | | 701/96 |
| 2014/0058579 A1* | 2/2014 | Ono | ........................ | G06F 17/00 |
| | | | | 701/1 |
| 2015/0183433 A1* | 7/2015 | Suzuki | .................. | B60W 10/06 |
| | | | | 701/96 |
| 2018/0001892 A1* | 1/2018 | Kim | ...................... | B60W 30/16 |
| 2018/0188745 A1* | 7/2018 | Pilkington | ............ | G05D 1/0295 |

FOREIGN PATENT DOCUMENTS

| | | |
|---|---|---|
| DE | 10 2010 028 637 A1 | 11/2011 |
| DE | 10 2011 118 135 A1 | 5/2012 |
| DE | 10 2011 002 275 A1 | 10/2012 |
| DE | 10 2015 209 592 A1 | 12/2016 |
| DE | 10 2015 211 117 A1 | 12/2016 |
| DE | 10 2016 009 129 A1 | 2/2017 |
| DE | 10 2016 012 465 A1 | 5/2017 |
| DE | 10 2016 012 466 A1 | 5/2017 |
| JP | 2007-283837 A | 11/2007 |
| SE | 1551395 A1 | 5/2017 |
| SE | 1551397 A1 | 5/2017 |
| WO | WO 2009/021598 A1 | 2/2009 |

OTHER PUBLICATIONS

German-language Written Opinion (PCT/ISA/237) issued in PCT Application No. PCT/EP2018/074624 dated Nov. 22, 2018 (six (6) pages).

German-language Search Report issued in German Application No. 10 2017 216 408.5 dated May 3, 2018 with partial English translation (11 pages).

Chinese-language Office Action issued in Chinese Application No. 201880059815.3 dated Aug. 26, 2022 with English translation (17 pages).

Chinese-language Search Report issued in Chinese Application No. 201880059815.3 dated Dec. 18, 2022 (two (2) pages).

* cited by examiner

ADAPTIVE DISTANCE SELECTION FOR OPTIMIZING EFFICIENCY

CROSS REFERENCE TO RELATED APPLICATIONS

This application is a continuation of PCT International Application No. PCT/EP2018/074624, filed Sep. 12, 2018, which claims priority under 35 U.S.C. § 119 from German Patent Application No. 10 2017 216 408.5, filed Sep. 15, 2017, the entire disclosures of which are herein expressly incorporated by reference.

BACKGROUND AND SUMMARY OF THE INVENTION

The present subject matter discloses a method for setting an optimized distance, depending on the situation, from a vehicle in front. By using the techniques disclosed herein, it is possible to increase energy efficiency and driving comfort. The present subject matter furthermore relates to a correspondingly configured system arrangement. Also proposed is a computer program product containing control commands that implement the method or operate the proposed system arrangement.

DE 10 2010 028 637 A1 discloses a method for electronically coupling a first vehicle and a second vehicle, wherein information about a vehicle property of the second vehicle is used for the electronic coupling, and the vehicle property of the second vehicle influences the resulting air resistance for the first vehicle.

DE 10 2015 209 592 A1 discloses a slipstream effect between consecutive vehicles. An energy expenditure for the first vehicle is higher than an energy expenditure of the following second vehicle or the following vehicles. With regard to fuel consumption, the vehicle driving in the slipstream of another vehicle consumes less fuel.

DE 10 2015 211 117 A1 discloses a method for saving fuel by driving with a short distance between vehicles. It is additionally possible to avoid accidents in the convoy by monitoring and controlling the distance between the vehicles using vehicle-to-vehicle communication without having to abandon driving in the convoy.

U.S. Pat. No. 9,266,536 B2 discloses a distance control cruise control system that can be individually adapted. In this case, a driving behavior that is learned by a machine is generally taken into account.

Slipstream effects are typically discussed in the context of driving in convoy on freeways or expressways, but these often do not require taking into consideration further parameters, such as a traffic light phase prediction or a planned turning procedure.

Known automatic distance maintenance and speed control systems (e.g., adaptive cruise control ACC) offer the option of setting the distance from the vehicle in front using operating controls. The distance increment from the vehicle in front is predefined directly by the driver, and the vehicle adjusts to this predefined time gap. There is, for example, just a slight reduction of the time gap when the vehicle in front decelerates. From a customer point of view, the ACC system often behaves in a nonintuitive manner.

One object of the present subject matter is to propose an improved method for setting an optimized distance, depending on a situation, from a vehicle in front, preferably in an automobile or in a motorcycle. According to the present subject matter, aspects in terms of electromobility and comfort aspects are also taken into consideration. Another object of the present subject matter is to provide a correspondingly configured system arrangement and a computer program product containing control commands that implement the method or at least partly operate the proposed system arrangement.

What is accordingly proposed is a method for setting an optimized distance and distance behavior, depending on a situation, from a vehicle in front. The method may further include detecting a current traffic situation and predicting a prospective traffic situation on a road section still to be traveled. There is a provision to measure an energy consumption, depending on a variation in the distance from the vehicle in front. The distance from the vehicle in front may be set depending on the currently detected traffic situation, the predicted traffic situation, and the measured energy consumption. As used herein, distance behavior may be understood to mean, according to one aspect of the present subject matter, inter alia, an extent of the "damping" of the distance control that is adapted depending on a situation. In particular, when recognizing and interpreting the situation, the system may directly set a target distance. This may be performed on the basis of application values and using simulation and test data.

Aspects are illustrated hereinafter in some cases with reference to electrically driven vehicles, but this should not be interpreted as being restrictive. The present subject matter is generally applicable to both electric vehicles and for vehicles having an internal combustion engine. In this respect, vehicles are generally developed according to the present subject matter. In this case, generally any vehicle, in particular an automobile or a motorcycle, may be considered a vehicle. The present subject matter is also applicable to purely electrically driven vehicles. The present subject matter is therefore advantageously effective especially for electrically driven vehicles, since not only are costs saved due to the slipstream effect or efficiency-oriented distance selection, but the reduced energy requirement also has a positive effect on the range of the vehicle.

The present subject matter may increase overall energy efficiency. Depending on the situation, it is more efficient to select a shorter or a longer distance from the vehicle in front. Shortly before turning situations, it may be expected that the vehicle in front will decelerate, in which a slightly increased distance may prove to be advantageous. If one's own desire is to perform a turn, when this is detected via the navigation system, efficient deceleration may be initiated early. If the state of the upcoming traffic lights or the time until the change is known from a traffic light phase prediction, then the distance may possibly be optimized early. If it is known that the traffic light will not be able to be passed on green, the distance may be increased early in order to initiate efficient deceleration so as to reduce the necessary braking force if the vehicle in front does so due to poor foresight.

If little or no braking is anticipated in the short term, it is more efficient to utilize the slipstream effect. For example, if the vehicle in front is driving very consistently with a relatively constant speed, and there is very low traffic density, it is more efficient to select a reduced distance to the vehicle in front in order to utilize the slipstream effect. In the event of very inconsistent behavior of the vehicle in front and/or relatively dense traffic, it is more efficient to select an increased distance. The reason is that a variable distance may then be implemented, such that the distance varies to allow more closing up and falling back from the vehicle in front. The speed profile is thus "smoothed" with respect to the vehicle in front and with respect to the current series ACC systems. Fewer and less severe periods of braking increase efficiency.

In the case of relatively dense traffic, the probability of other vehicles cutting in or the current vehicle in front having to brake suddenly due to other vehicles is higher. A greater distance is also recommended from an efficiency viewpoint. The traffic density can be estimated from data services, such as real-time traffic data, estimated from the difference between the expected speed and the speed limit, or from sensor evaluations. Depending on the road type (e.g., freeway, cross-country route, city, etc.), different dynamics of the vehicle in front should be expected and therefore, taken into consideration in order to optimize the distance.

Utilizing the slipstream effect is worthwhile only starting from relatively high speeds, and therefore, a short distance is not worthwhile at low speeds. In the case of very dense traffic, it is more efficient to drive at a large distance, but this would lead to a gap in the traffic. This would in turn be unacceptable to drivers. It is therefore always necessary to balance efficiency and customer acceptance. This is decided by the policy, which can be influenced by the driver.

According to a first aspect of the present subject matter, the vehicle decides independently, for example using a policy, which distance from the vehicle in front is most suitable depending on a situation. Decision criteria include:

driving as close as possible to a vehicle in front in order to utilize the slipstream effect;

maintaining a large distance in order to be able to react very early to other traffic participants and traffic participants in front (prediction potential) to achieve an efficiency optimization of the speed profile by reducing the number and severity of braking occurrences; and/or maintaining a short distance from the vehicle in front in order to not be passed (i.e., overtaken), especially in very dense traffic.

Optimization between these criteria thus preferably, but not exclusively, takes place on the basis of traffic density, speed, speed limit, dynamics of the vehicle in front, type of the vehicle in front (e.g., truck vs. automobile), road type, and predicted data, such as change in a speed limit, planned and/or possible turning procedures, inclines and/or traffic light phase prediction. As a result, energy consumption of the vehicle is reduced in automated longitudinal operation. Automated longitudinal operation relates both to ACC and to other (autonomous) driving functions. Increased comfort during ACC operation is additionally achieved, as well as more intuitive behavior of the vehicle in general during ACC operation. By virtue of the automated distance control, it may be possible to dispense with the distance selection buttons on the multifunction steering wheel, which may also reduce costs. This also has the effect that the cockpit can be designed more intuitively, since fewer buttons are required overall. Dynamics relate to whether the driver of the vehicle in front is driving consistently and at a constant speed or is driving inconsistently and is regularly decelerating and/or accelerating. In the case of low dynamics of the vehicle in front, it may be optimum from an efficiency standpoint to reduce the distance in order to utilize advantages due to slipstream effects. In the case of high dynamics of the vehicle in front, an increased distance is more efficient in order to be able to smooth the speed profile and avoid unnecessary decelerations or to decelerate to a less pronounced extent. The expected dynamics may additionally change depending on the road type (freeway, cross-country route, city). In the case of large inclines, vehicles in front may brake suddenly in order to comply with the speed limit. For example, in the case of a truck as the vehicle in front, low dynamics should be expected during which it is possible and desirable to drive closer from an efficiency viewpoint. On the other hand, driving very close to trucks may be perceived as uncomfortable by the driver, and weighting may therefore be performed here.

The distance control according to the present subject matter makes provisions for a vehicle, preferably an automobile, to follow another vehicle and to set a cruise control system in the process. Such distance control involves setting a permanent distance such that the vehicle is always at substantially the same distance from the vehicle in front.

The method according to the present subject matter offers the advantage that a distance control cruise control system is assisted in determining and setting a suitable target distance between two vehicles, taking into consideration the energy consumption. In this case, the method is executed by a tailing vehicle that reduces the distance to a vehicle in front. The required following distance from the following vehicle generally has to be complied with. It is also necessary to react appropriately to braking procedures of the vehicle in front.

According to the present subject matter, a target distance is set, taking into account various parameters. In this case, it is advantageous, for example, to measure an energy consumption during a journey such that the actual energy consumption can be determined depending on vehicle parameters. In the present case, various parameters are weighted and a determined actual energy consumption is considered. An energy consumption may be electricity in an electrically-driven vehicle but may also be fuel consumption of an internal combustion engine. Energy consumption depends on the driving speed and on the size of the vehicle in front and of one's own vehicle.

Specifically, the energy requirement does not have to be calculated during a current journey in order to achieve an optimization from the abovementioned criteria (e.g., slipstream effect, prediction, gap). An ideal application may rather be determined here by sample journeys. An energy consumption may be measured during a current journey but may also be determined empirically beforehand during one or more sample journeys. Corresponding measured results may then be stored.

According to the present subject matter, the actual energy consumption is taken into consideration depending on a variation in the distance and not a theoretically predefined value. It is possible to drive at a short distance to the vehicle in front for a certain time while measuring the energy consumption, and to drive at a slightly increased distance for a further time period such that it is possible to recognize a difference between the two sets of energy consumption data. For example, a truck in front forms a larger slipstream than a smaller vehicle. An influencing variable is thus measured during the journey and can be taken into consideration. The consumption advantage brought about by the slipstream effect can be measured beforehand on a testing ground and/or determined through simulation, depending on distance and speed and type of vehicle in front.

The input parameters, such as, inter alia, speed, type of vehicle in front, dynamics of the vehicle in front, road type, turning options, planned turns, change of speed limit, traffic density, and the like, are evaluated in an applicative manner and result in a target distance. This is set "softly" in order to smooth/calm the profile of the longitudinal speed and thus increase efficiency and comfort.

In the case of a target distance, there is generally a minimum distance that should always be complied with by law and/or due to technical limits of the sensor system and a further distance to be added that may be variably configured. This variable distance may then be set according to the current traffic situation, an estimated traffic situation, and an energy consumption. In this case, it is advantageous for the individual parameters to be weighted or prioritized. If the slipstream effect has a large effect on the energy consumption, then this consumption advantage may be taken into consideration to a greater extent. If a dense traffic situation is generally prevalent, then the safety level may be increased, and the distance may be increased. A balanced distance between a particularly short distance in order to utilize the slipstream effect and a particularly large distance in order to create braking spaces is thus created. There may generally be weighting between the short and larger distance in order to optimize efficiency.

The target distance may be defined by a time gap from the vehicle in front. When specifying a minimum distance, compliance with legal requirements and safety assumptions should be taken into consideration. An increased distance may be advantageous for the energy requirement and result in an increased prediction potential. If the vehicle in front brakes, one's own vehicle may initially react with a reduced deceleration, and close the gap. Should the vehicle in front change lanes or accelerate again, one's own vehicle may immediately end the deceleration. A lower speed reduction with respect to the vehicle in front and also with respect to current ACC systems is thus achieved.

The optimized distance is set such that the distance can be either reduced or increased depending on which traffic parameters are present. The system according to the disclosed subject matter is not just a safety system that always selects the distance to be as large as possible. Rather, the energy consumption is also taken into consideration depending on a vehicle in front and depending on influencing variables that make a shorter distance appear optimum.

It is also possible for the driver to influence the optimized distance and to specify, for example, via a display, which parameters are particularly important to him. For example, if it is the driver's intention to drive in a straight line for a long time, then the energy consumption may be optimized, and the current traffic situation may be set to a lower priority. It is in particular advantageous to predict a traffic situation such that for example a navigation device is read or machine learning is performed. The driver may also specify a trend using the parameters, for example, if he or she prefers to drive with a shorter or longer distance from the vehicle in front.

It is thus possible to determine the route beforehand, and the target distance may be set accordingly. If the intention is to drive in a straight line for a long time, energy consumption should be optimized. It is also possible to detect that a turn should be performed shortly, as the route plan makes provision for this.

If the vehicle in front is driving inconsistently, then the distance should not be further reduced for efficiency reasons. In this case, it is more efficient to select a larger distance to gain prediction potential in order to smooth the speed profile. A vehicle in front that changes lanes is not necessarily followed. Rather, this may be the decision of the driver unless a true convoy assistant that provides automatic following of the vehicle in front is involved. In the latter case, the frequency of lane changes may be considered in making the decision as to which distance is more efficient.

According to one aspect of the present subject matter, the current traffic situation is detected using a distance control cruise control system, an imaging sensor, a camera, a data service and/or radar. This has the advantage that existing systems may be reused, and therefore, the traffic can be detected immediately ahead of the vehicle. It is thus also possible to react to the current traffic situation in the short term.

According to a further aspect of the present subject matter, the traffic situation is predicted using a machine learning method, a data service, and/or a route plan. This has the advantage that even the greater distance from the vehicle can be taken into consideration, and the distance can be set predictively.

According to a further aspect of the present subject matter, the energy consumption is measured such that energy consumption is measured at a first distance and at a second distance. This has the advantage that the energy requirement can be estimated, and an important parameter can be incorporated into the distance setting. The extent of the energy saving can be taken into consideration. If there is a strong energy-saving effect in the case of close-up driving, then this parameter may accordingly be taken into consideration to a greater extent. Consideration may also be given indirectly to dimensions of one's own vehicle and of the vehicle in front.

According to a further aspect of the present subject matter, the distance is set depending on a stored policy. This has the advantage that a manufacturer, for example, can store control commands that can be checked before the start of the journey. The individual parameters are able to be weighted such that a target distance is proposed or set directly.

According to a further aspect of the present subject matter, the policy is determined empirically and/or adapted by a driver. This has the advantage that a suitable policy can be created both under standard conditions and directly during driving operation. This also includes setting the parameters as to when which rule is to be applied. In addition to efficiency optimization, customer acceptance is also taken into consideration. For example, customer acceptance may mean avoiding excessively great distances in very dense traffic to reduce the likelihood of being passed or overtaken.

According to a further aspect of the present subject matter, the policy stores parameters that give an indication as to the distance to be set. This has the advantage, for example, that a table can be provided setting the target distance based on the detected values. It is possible to specify ranges of values that specify the extent to which these parameters affect the distance. If it is detected, for example that, when driving closely, the energy saving brought about by the slipstream effect is barely noticeable, a rule may state that this value should not be taken into consideration. If a determined traffic density is measured, then it may be recognized that a hazard potential is large and this value should be taken into consideration to a greater extent. The table may store expected values and combinations of values that make it possible to conclude a target distance. It is possible for the driver to specify a distance trend using a setting, for example, via a button.

According to a further aspect of the present subject matter, the distance is set depending on one or more of traffic density, at least one speed, predicted data, a change in a speed instruction, a planned turning procedure, a traffic light phase prediction and/or further data detected by sensors. This has the advantage that a multiplicity of parameters are able to be taken into consideration to effect an optimum distance. It is thus also possible to consider many combinations of values. The traffic situation may be comprehensively taken into consideration.

The object is also achieved by a system arrangement for setting a distance, optimized depending on a situation, from a vehicle in front. The system has a first detection unit configured so as to detect a current traffic situation. A second detection unit is configured so as to predict a prospective traffic situation on a road section still to be traveled. A measurement unit is configured so as to measure an energy consumption depending on a variation in the distance from the vehicle in front. A configuration unit is configured so as to set the distance from the vehicle in front depending on the currently detected traffic situation, the predicted traffic situation and the measured energy consumption. The apparatuses may be provided separately or as one component. For example, the first detection unit may be a device that also provides the functionality of the second detection unit. Components that are in some cases present may also be reused and only driven according to the present subject matter.

The object is also achieved by a computer program product containing control commands that execute the method and operate the proposed arrangement when they are executed on a computer.

According to the present subject matter, it is particularly advantageous for the method to be able to be used to operate the proposed devices and units or the system arrangement. The proposed devices and apparatuses are furthermore suitable for executing the method according to the present subject matter. The device in each case implements structural features that are suitable for executing the corresponding method. The structural features may however also be designed as method steps. The proposed method also retains steps for implementing the function of the structural features.

Further advantages, features and details of the present subject matter will become apparent from the following description, which describes aspects of the present subject matter in detail with reference to the drawings. In this case, the features mentioned in the claims and in the description may be essential in each case on their own or in any desired combination. The abovementioned features and those explained in more detail here may likewise be used on their own or in multiple form in any desired combination. The terms "left" and "right" used in the description of the exemplary embodiments relate to the drawings in an alignment with a normally legible annotation of the figures or normally legible reference signs. The embodiments that are shown and described should not be understood as being conclusive but rather have an exemplary nature in order to explain the present subject matter. The detailed description serves as information for those skilled in the art, and therefore, known circuits, structures and methods are not shown or explained in detail in the description in order not to complicate the understanding of the present description.

Other objects, advantages and novel features of the present subject matter will become apparent from the following detailed description of one or more preferred embodiments when considered in conjunction with the accompanying drawings.

DETAILED DESCRIPTION OF THE DRAWINGS

Figure 1:
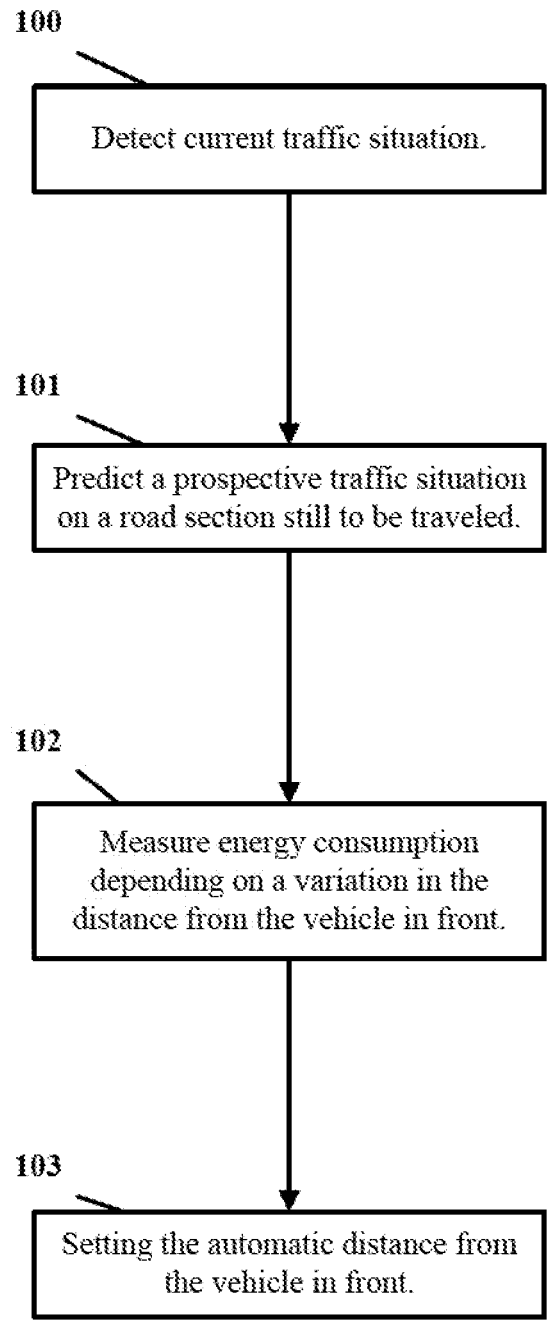
FIG. 1 shows a schematic flowchart of a method for setting a distance optimized depending on a situation according to one aspect of the present subject matter.

FIG. 1 shows a schematic flowchart of a method 110 for setting a distance, optimized depending on a situation, from a vehicle in front. The method 110 comprises detecting 100 a current traffic situation, and predicting a prospective traffic situation 101 on a road section still to be traveled, wherein there is provision to measure 102 an energy consumption depending on a variation in the distance from the vehicle in front. The method 110 further includes setting 103 the distance from the vehicle in front depending on the currently detected 100 traffic situation, the predicted traffic situation 101 and the measured 102 energy consumption. A person skilled in the art in this case recognizes that the steps 100-103 may comprise further substeps, and in particular, that the method steps may in each case be executed iteratively and/or in another order. The detection of the current traffic situation 100, the predictive detection 101 of the traffic situation and the measurement 102 may be in parallel or executed in another order.

Figure 2:
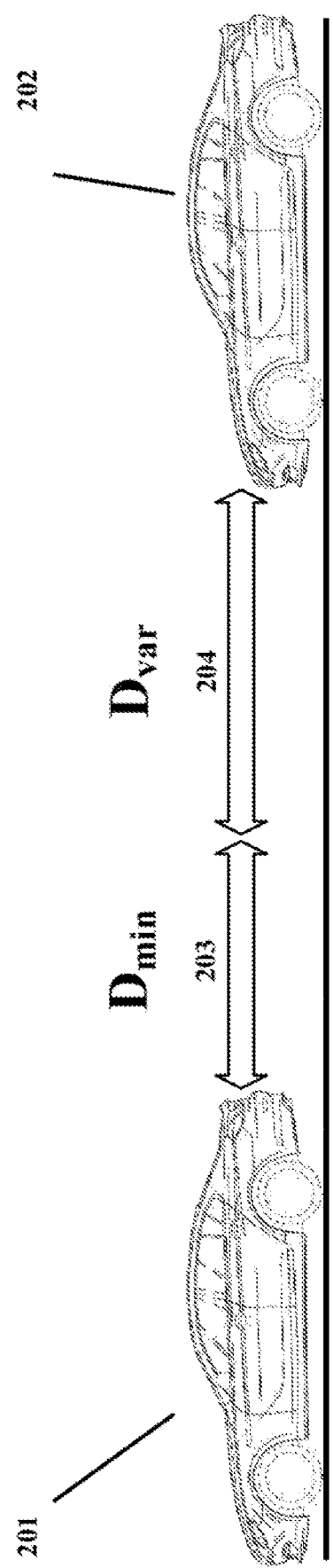
FIG. 2 shows a schematic application scenario of the proposed method or of the proposed system arrangement according to a further aspect of the present subject matter.

FIG. 2 shows a schematic application scenario of the present subject matter. In particular, FIG. 2 shows two consecutive vehicles 201/202, wherein the rear vehicle 202, depicted on the right, implements the proposed method. The vehicle 201 in front is depicted on the left. The present figure furthermore depicts that the distance to be complied with is set such that a minimum distance $D_{min}$ 203 is to be complied with and a variable distance $D_{var}$ 204. The minimum distance 203 is that distance that needs to be complied with merely for safety reasons and in which there is no room for optimization. A variable distance $D_{var}$ 204 is also to be provided, this allowing the driver to set whether he wishes to tend to drive closer or further away. This second range or this second distance may thus be varied or optimized according to the proposed method.

In an example, the driver may drive closer to the minimum distance 203 for a particular time period and measure an energy consumption of his vehicle. The driver may then drop back again and likewise measure an energy consumption. The extent to which the distance from the vehicle in front affects the energy consumption can be assessed. It is also possible to perform weighting as to what extent the slipstream effect should be utilized. If, for example, a truck is driving ahead of the vehicle, then the energy consumption is significantly improved if the tailing vehicle drives closely. If it is however a vehicle of small size, the energy consumption is not influenced by the distance, as the slipstream is small in this case.

A truck is recognized immediately using a sensor system. Due to this, it is possible to decide beforehand whether a reduced distance is recommended. The consumption advantages linked to distance and speed are known from simulations and measurements on the testing ground for vehicles in front that are automobiles, on the one hand, and for vehicles in front that are trucks, on the other hand.

The proposed method provides an option, when setting a target distance, to consider actual energy consumption, this in turn varying depending on the slipstream effect. This thus gives the contribution that, where possible, the slipstream effect can be utilized optimally in the context of further parameters, and energy can be saved. This is advantageous for combustion engine-driven vehicles, where optimizing the energy consumption has a direct effect on the range of the vehicle, specifically in the case of electrically driven vehicles. The proposed method is thus preferably used in electrically driven vehicles, but this should not be understood as being restrictive.

The present subject matter may optimize the distance behavior during automated longitudinal operation. Coasting procedures or propulsion operation may be initiated when the vehicle in front initiates braking, and thus initiates a slight reduction in the distance from the vehicle in front. This likewise contributes to smoothing the speed profile and reducing the frequency and/or severity of mechanical and/or electrical braking occurrences. The efficiency is increased by virtue of a reduced speed decrease and an increased rolling or coasting component.

The foregoing disclosure, for the purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical application, to thereby enable others skilled in the art to utilize those embodiments, as well as various embodiments with various modifications as may be suited to the particular use contemplated.

What is claimed is:

1. A method for setting an automatic following distance from a vehicle in front, wherein the automatic following distance comprises a minimum distance and a variable distance, the method comprising:
   detecting a following distance from the vehicle in front based on one or more of:
      an automatic cruise control (ACC) system,
      an imaging sensor,
      a camera,
      a data service, and/or
      a radar;
   predicting a prospective traffic situation on a road section still to be traveled;
   measuring a first actual energy consumption while driving at the minimum distance from the vehicle in front, wherein the minimum distance is non-variable and corresponds to a minimum following distance that may be defined for the ACC system and maintained from the vehicle in front;
   measuring a second actual energy consumption while driving at a second distance greater than the minimum distance from the vehicle in front;
   determining the variable distance of the automatic following distance based on:
      the detected following distance from the vehicle in front,
      the predicted prospective traffic situation, and
      the first and second measured actual energy consumptions; and
   setting, in the ACC system, the automatic following distance from the vehicle in front by summing the minimum distance and the variable distance.

2. The method according to claim 1, wherein the prospective traffic situation is predicted using a machine learning method, a data service and/or a route plan.

3. The method according to claim 1, wherein the automatic following distance is further set depending on a stored policy.

4. The method according to claim 3, wherein the stored policy is adapted by input of a driver.

5. The method according to claim 3, wherein the stored policy stores a table of parameters that specify the automatic following distance to be set based on detected values.

6. The method according to claim 1, wherein the variable distance of the automatic following distance is further determined depending on one or more of:
   traffic density,
   a change in a speed instruction,
   a planned turning procedure,
   a traffic light phase prediction,
   a type of vehicle in front, or
   a road type.

7. The method according to claim 1, further comprising:
   detecting a size of the vehicle in front; and
   the variable distance of the automatic following distance from the vehicle in front further depends on the detected size of the vehicle in front.

8. The method according to claim 1, further comprising:
   predicting that the vehicle in front will turn based on data received via a navigation system; and
   increasing the variable distance of the automatic following distance from the vehicle in front based on the predicting that the vehicle in front will turn.

9. The method according to claim 1, wherein the automatic following distance from the vehicle in front further depends on a difference between the first and second measured actual energy consumptions.

10. The method according to claim 1, wherein the variable distance decreases as a detected size of the vehicle in front increases.

11. The method according to claim 9, further comprising:
    increasing the variable distance when the difference between the first and second measured actual energy consumptions is negligible.

12. The method according to claim 1, further comprising:
    decreasing the variable distance in response to detecting an increase in traffic density.

13. The method according to claim 1, further comprising:
    increasing the variable distance in response to predicting a traffic light phase will not be able to be passed on green.

14. An automatic cruise control (ACC) system for setting an automatic following distance from a vehicle in front, wherein the automatic following distance comprises a minimum distance and a variable distance, the system comprising:
   a first detection device configured to detect a following distance from the vehicle in front;
   a second detection device configured to predict a prospective traffic situation on a road section still to be traveled;
   a processor;
   a memory in communication with the processor, the memory storing a plurality of instructions executable by the processor to cause the system to:
      measure a first actual energy consumption while driving at the minimum distance from the vehicle in front, wherein the minimum distance is non-variable and corresponds to a minimum following distance that may be defined for the ACC system and maintained from the vehicle in front;
      measure a second actual energy consumption while driving at a second distance greater than the minimum distance from the vehicle in front;

determine the variable distance of the automatic following distance based on:
- the detected following distance from the vehicle in front,
- the predicted prospective traffic situation, and
- the first and second measured actual energy consumptions; and set, in the ACC system, the automatic following distance from the vehicle in front to a summation of the minimum distance and the variable distance.

15. The system according to claim 14, wherein
the variable distance of the automatic following distance is further determined depending on one or more
- traffic density,
- a change in a speed instruction,
- a planned turning procedure,
- a traffic light phase prediction,
- a type of vehicle in front, or
- a road type.

16. The system according to claim 14, wherein
the automatic following distance from the vehicle in front further depends on a difference between the first and second measured actual energy consumptions.

17. The system according to claim 16, wherein the memory further stores instructions executable by the processor to cause the system to:
increase the variable distance when the difference between the first and second measured actual energy consumptions is negligible.

18. The system according to claim 14, wherein
the automatic following distance is further set depending on a stored policy that stores a table of parameters that specify the automatic following distance to be set based on detected values.

19. The system according to claim 14, wherein the memory further stores instructions executable by the processor to cause the system to:
increase the variable distance when a difference between the first and second measured actual energy consumptions is negligible.

20. The system according to claim 14, wherein
the prospective traffic situation is predicted using a machine learning method, and/or a route plan.

21. A non-transitory computer-readable medium comprising instructions operable, when executed by one or more computing systems, to:
detect a following distance from a vehicle in front based on one or more of:
- an automatic cruise control (ACC) system,
- an imaging sensor,
- a camera,
- a data service, and/or
- a radar;

predict a prospective traffic situation on a road section still to be traveled;

measure an actual energy consumption depending on a variation in the following distance from the vehicle in front, wherein the variation is a difference between a minimum distance that is non-variable and corresponds to a minimum following distance that may be defined for the ACC system and maintained from the vehicle in front, and a second distance greater than the minimum distance from the vehicle in front; and determine a variable distance of the automatic following distance based on:
- the detected following distance from the vehicle in front,
- the predicted prospective traffic situation, and
- the measured actual energy consumption; and set, in the ACC system, an automatic following distance from the vehicle in front to a summation of the minimum distance and the variable distance.

* * * * *